(No Model.)
N. B. RICE.
EVAPORATOR.
No. 351,796. Patented Nov. 2, 1886.
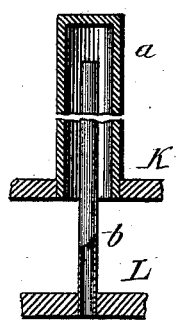
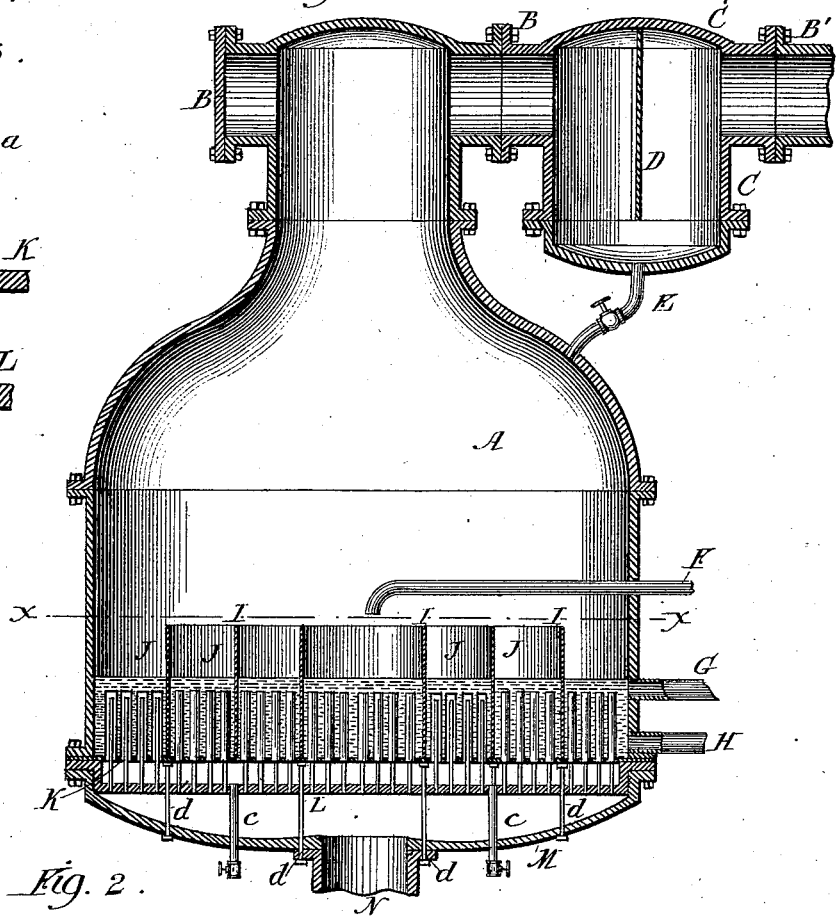
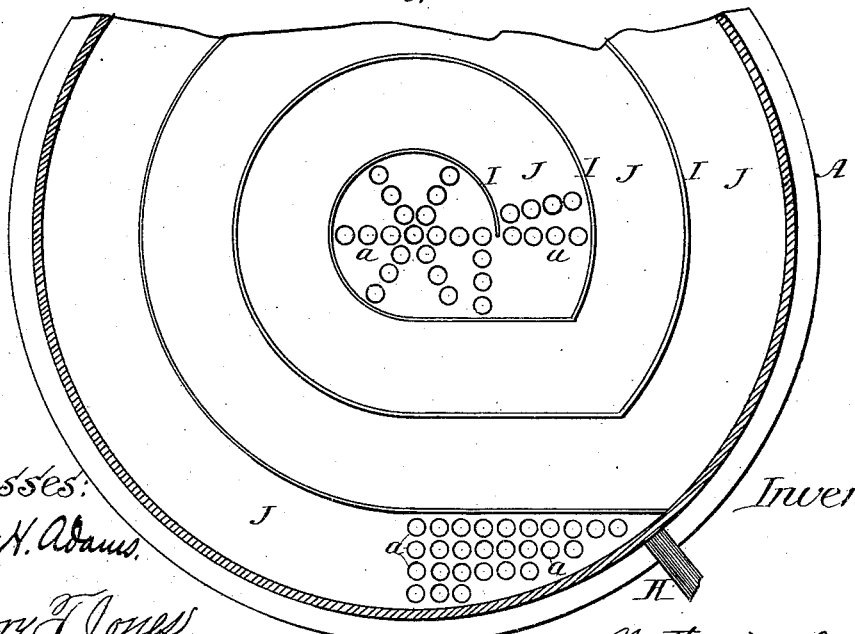

UNITED STATES PATENT OFFICE.

NATHANIEL B. RICE, OF CHICAGO, ILLINOIS.

EVAPORATOR.

SPECIFICATION forming part of Letters Patent No. 351,796, dated November 2, 1886.

Application filed January 30, 1886. Serial No. 190,382. (No model.)

*To all whom it may concern:*

Be it known that I, NATHANIEL B. RICE, residing at Chicago, in the county of Cook and State of Illinois, and a citizen of the United States, have invented certain new and useful Improvements in Evaporators, of which the following is a full description, reference being had to the accompanying drawings, in which—

Figure 1 is a vertical section, Fig. 2 a cross-section on line *x x* of Fig. 1, and Fig. 3 a detail, of the heating-tubes.

The object of this invention is to improve the construction and operation of evaporators used in the vacuum process of evaporating the water from saccharine liquors, milk, gelatinous liquors, and other liquids; and its nature consists in the several parts and combinations of parts, hereinafter described and claimed as new.

In the drawings, A indicates the outer case or shell; B, pipe for connecting with the trap or enlarged section C; B', pipe to air-pump, or to second evaporator when more than one is used; C, interposed section for the detaining and returning of valuable matter carried over; D, partition-plate, against which the spray is condensed; E, connecting-tube; F, feed-pipe; G, surface discharge-pipe; H, bottom discharge-pipe; I, partition-plate; J, channels; K L, division-plates; M, bottom plate; N, inlet-pipe for steam or vapor; *a*, capped heating-tubes; *b*, steam-tubes; *c*, discharge-pipes for water of condensation; *d*, stay-bolts.

The shell or case A is usually made of cast-iron in the sections and the form shown. Eight feet in diameter and from ten to twelve feet in height is a convenient size. These proportions, however, may be varied, according to the desired quantity of liquid to be treated and to the location in which the apparatus is to be placed.

The outer case may be made square, oblong, or oval, and when made angular the partition plate or plates will be given a corresponding form; or plates may be so placed as to form a zigzag channel, and when the channel is so formed the partition will be made of separate plates, instead of a continuous one.

The shell A, connecting-pipes B, and receptacle C have heretofore been used, and do not therefore require any particular description, it being understood that the evaporator here shown may be economically used alone, with suitable appliances for exhausting and discharging the liquid; but it is more especially designed to be used in connection with one or two additional evaporators of a similar construction, the whole apparatus having the necessary exhaust and discharge appliances. The interior of the evaporator is divided into a continuous channel, J, by the partition I, which may be arranged in scroll form for a circular or oval case; but I prefer the arrangement shown, which is partly concentric and partly tangential. The partition I extends from a suitable distance above the liquid down to and is connected with the plate K, so as to form a channel of a somewhat greater depth than that of the liquid to be treated.

The channel J is provided with heating-tubes *a*, which are attached to the plate K, as shown in Fig. 3. As many of these heating-tubes as can be conveniently attached are used. The plate K is held in position by being made to project or pass between the flange of the outer case, and by stay-bolts, as shown in Fig. 1. Beneath this plate is located the plate L, suitably held in place, which plate L is provided with steam-tubes *b*, which project up into the capped tubes *a* nearly to their top, so as to insure the expulsion of any contained air and the traversing of the heating-tubes *a* by the steam or vapor introduced for heating purposes.

The steam, which is usually exhaust-steam for the first evaporator, passes in at the opening *n* through the tubes *b*, and it is discharged near the top of the capped tubes *a*, from which it descends into the space between the plates K L, where it may be retained or permitted to pass out by suitable appliances. The water of condensation which may accumulate in this space is drawn off through the pipes *c*, two of which are shown; but one larger one may be used in the place of the two shown.

The apparatus is also provided with a surface discharge-tube, G, which may be used to limit the height of the liquid or to draw from the surface of the liquid, when desired. An ordinary stop-cock is to be applied to these pipes H and G.

The liquid treated is drawn off at the pipe H, which is located at the extreme outer end and bottom of the channel J, as shown in Fig. 2. Either or both of the tubes H G may be connected with any suitable receiver for the liquid, or with an adjoining evaporator, according as to whether it is used singly or in a series of evaporators.

The feed-tube F delivers the liquid to be treated at the center of the evaporator, from which point it traverses the channel J around the interior of the evaporator until it reaches the outlets H G. In this apparatus the liquid to be treated is outside of the heating-tubes $a$, which are made to project up into the liquid, as shown in Fig. 1. By this arrangement the steam or vapor used for heating will be so delivered that its hottest point will come in contact with the tube $a$ near the top, and within the liquid, and thus produce the best results and give a very large heating-surface, it being understood that the channel J is filled with these heating-tubes $a$, a portion of which only are shown in Fig. 2. By this arrangement the liquid to be evaporated is delivered at or near the center and caused to traverse the channel, so as to become properly heated, thereby producing a more rapid evaporation and a uniformity of liquid of increasing density, such as is not produced when there is no circulation or current of the liquid within the evaporator.

In the apparatus heretofore in use the liquid has been admitted and treated *en masse*, so that when the evaporator is used as one of a series the same liquid is liable to remain in the same evaporator without being moved during the entire period of a run, while by this arrangement the liquid is constantly changed when it passes from one evaporator to another, and a uniformity of product is thereby obtained of a superior quality.

What I claim as new, and desire to secure by Letters Patent, is—

1. The combination of the division plate or plates I with the plate K, whereby the liquid is caused to move and traverse the channel J, substantially as specified.

2. The combination, with the outer case or shell, A, of the feed-tube F, the continuous spiral channel J, beneath said feed-tube, and a discharge-pipe communicating with said channel, substantially as described.

3. The combination, with the outer case, A, of the feed-tube F, the continuous spiral channel J, the vertical heating-tubes $a$, arranged within said channel, the steam-tubes $b$, and plates M and L, substantially as described.

NATHANIEL B. RICE.

Witnesses:
HARRY T. JONES,
EDGAR T. BOND.